United States Patent [19]

Brown

[11] Patent Number: 5,153,280
[45] Date of Patent: Oct. 6, 1992

[54] PREPARATION OF SULPHONATED POLYKETONES

[75] Inventor: Stephen L. Brown, Ashford, England

[73] Assignee: The British Petroleum Company p.l.c., London, England

[21] Appl. No.: 581,026

[22] Filed: Sep. 12, 1990

[30] Foreign Application Priority Data

Sep. 14, 1989 [GB] United Kingdom ............... 8920798

[51] Int. Cl.$^5$ ............................................. C08G 67/02
[52] U.S. Cl. .................................................... 525/539
[58] Field of Search ........................................ 525/539

[56] References Cited

FOREIGN PATENT DOCUMENTS 0372602  6/1990  European Pat. Off. .

OTHER PUBLICATIONS

Macromolecules, vol. 17, No. 12, Dec. 1984, pp. 2830-2837, American Chemical Society, Washington, U.S; R. Gooden et al.: "Solid-State photochemistry of poly(ethylene-co-carbon monoxide), Model studies of polyethylene photochemistry" *p. 2832*.

Primary Examiner—Harold D. Anderson
Attorney, Agent, or Firm—Brooks Haidt Haffner & Delahunty

[57] ABSTRACT

Sulphonated polyketones are prepared by reacting a linear alternating copolymer of carbon monoxide and one or more olefins (polyketone) with a sulphonating agent (e.g. chlorosulphuric acid) in a solvent (e.g. dichloromethane) at a temperature in the range $-20°$ to $+40°$ C. A molar excess of sulphonating agent is preferably used. The sulphonated polyketone produced contains one or more types of unit of formula $-[COC(R^1)_2C(R^1)_2]-$ wherein the $R^1$ groups are independently H, $C_1$ to $C_{10}$ alkyl or $SO_3H$ with the proviso that at least one $R^1$ group is $SO_3H$.

3 Claims, 2 Drawing Sheets

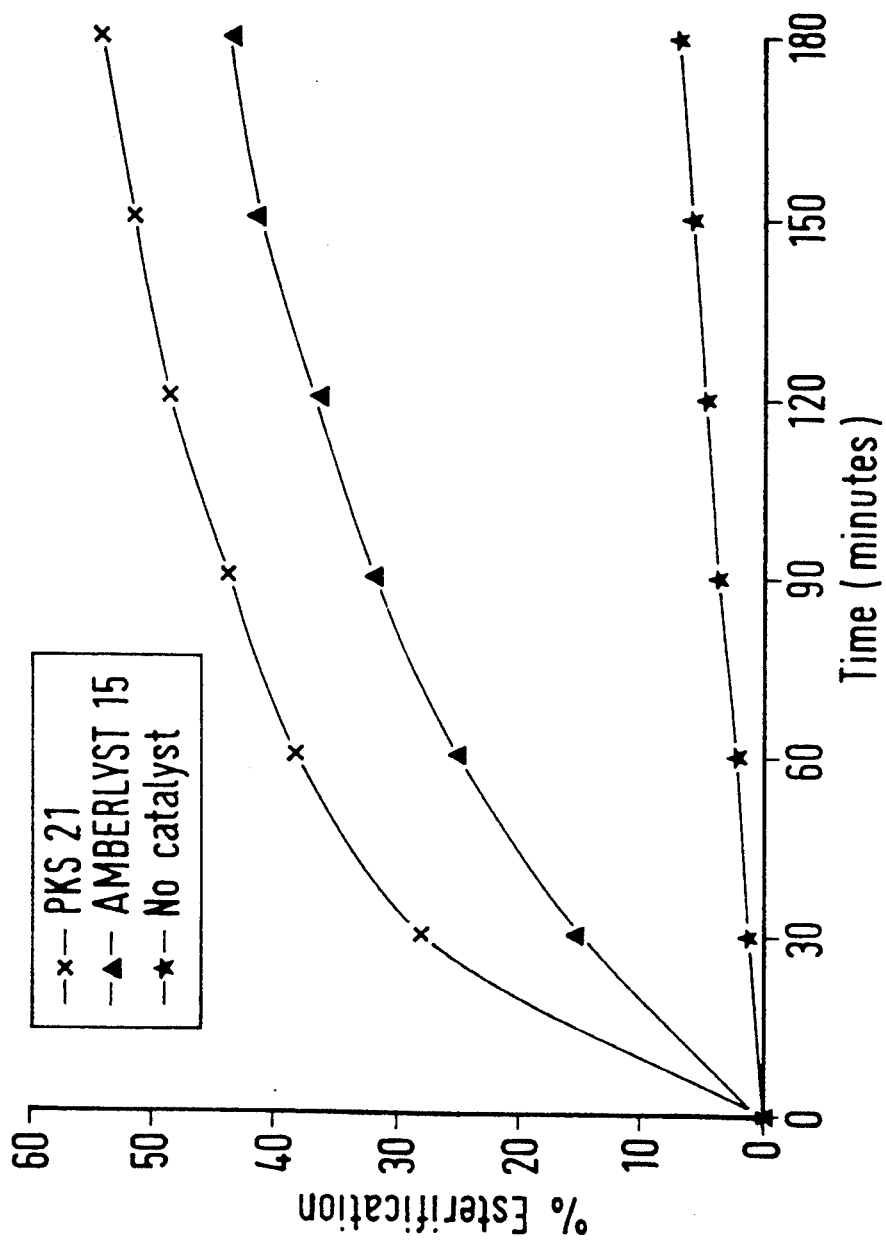

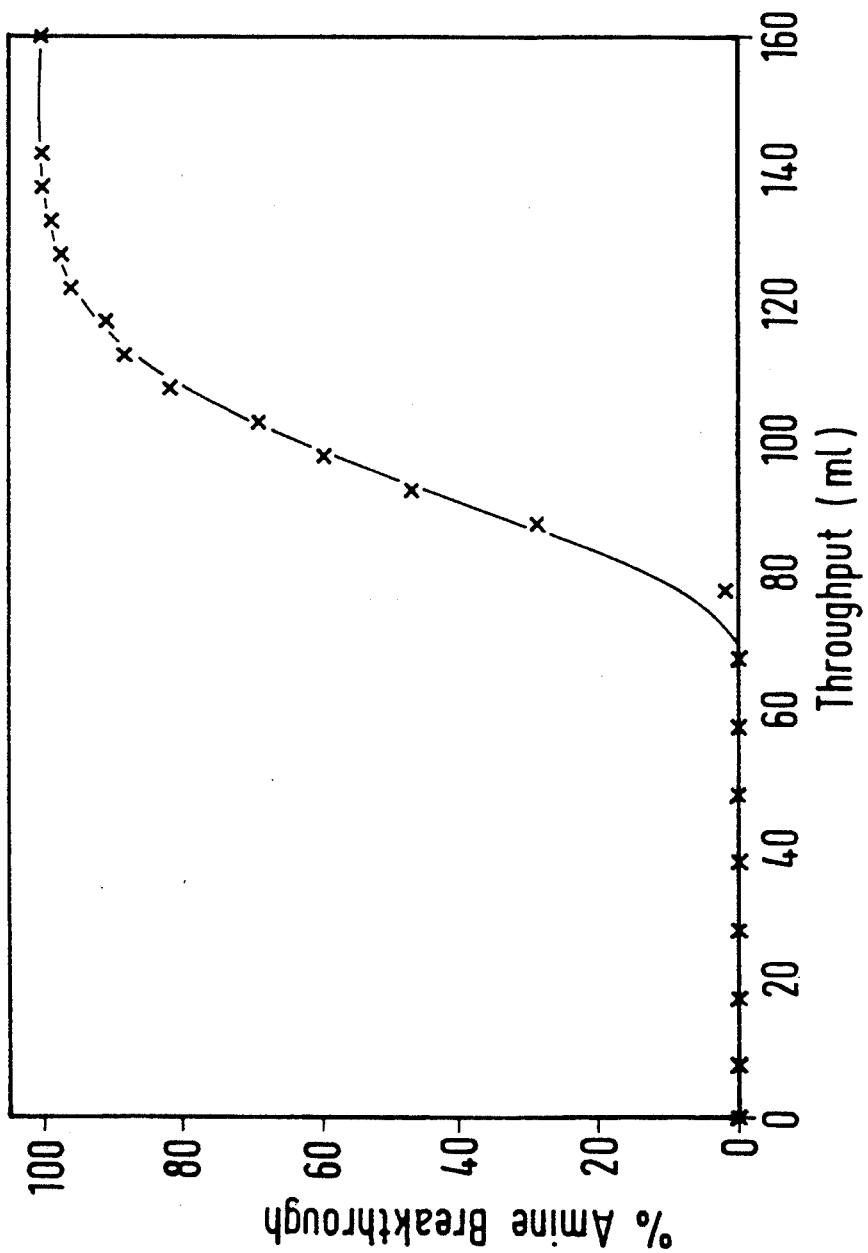
FIG. 2 AMINE REMOVAL SULPHONATED POLYKETONE
0.5% ET2NH in MeOH

PREPARATION OF SULPHONATED POLYKETONES

The present invention relates to a class of new polymers called sulphonated polyketones and processes for their preparation.

EP121965 and EP234671 discloses a class of polymers, hereafter called polyketones, which can be synthesised by the action of carbon monoxide on alkene(s) in an alcohol in the presence of a palladium catalyst, a chelate phosphine and an anion of an acid having a pKa less than two. The polyketones produced are linear alternating copolymers of carbon monoxide and the alkene(s) employed.

It has now been found that polyketones of the type disclosed in EP121965 and EP234671 may be modified by sulphonation and that the resulting sulphonated polyketones are strongly acidic solids useful as acidic catalysts in for example homogeneous and heterogenous catalytic processes.

Accordingly the present invention comprises a polymer of one or more types of unit of the general formula:

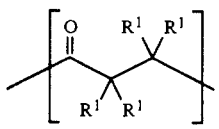

(I)

where the $R^1$ groups are independently selected from H or $C_1$ to $C_{10}$ alkyl or $SO_3H$ with the proviso that at least one $R^1$ group is $SO_3H$. It is preferred that those $R^1$ groups which are not $SO_3H$ are selected from H or $C_1$ to $C_4$ alkyl, most preferably H or methyl.

The new polymers are stable and the $SO_3H$ groups are strongly acidic as a result of the electron withdrawing power of the ketone functionality.

Whilst the polymer of the present invention may consist exclusively of units of the general formula given above it is envisaged that the polymer may also contain other units. In particular, since the polymer has been produced by sulphonation of a corresponding polyketone, the polymer may also contain one or more types of unit having the formula:

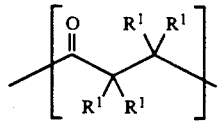

(II)

wherein the $R^1$ groups are independently selected from H or $C_1$ to $C_{10}$ alkyl only.

It will also be appreciated that the polymer may also be comprised of one or more unit of the general formula:

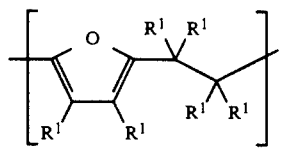

(III)

due to dehydration of the polyketone. In this formula the $R^1$ groups are independently selected from H, $C_1$ to $C_{10}$ alkyl or $SO_3H$.

The polymer is preferably comprised of 15–100% by weight of units of formula (I).

The polymer defined above can be prepared by a process which comprises the step of sulphonating a corresponding polyketone comprised of one or more types of unit of formula II. Typical processes for effecting such a sulphonation are described in the textbook "Sulphonation and Related Reactions" E E Gilbert, Interscience Publishers, NY 1965. A particularly good method of sulphonation consists of reacting a slurry of the polyketone with a sulphonating agent in the presence of a solvent. The preferred solvents are halogenated solvents e.g. dichloroethane and glacial acetic acid, with dichloroethane being most preferred. Preferably the process is carried out at a temperature in the range $-20°$ to $+40°$ C., most preferably $-5°$ to $+5°$ C. Suitable sulphonating agents include chlorosulphonic acid, concentrated sulphuric acid, pyridine/sulphur trioxide, 2,6-lutidine/sulphur trioxide and mixtures of chlorosulphonic acid with concentrated sulphuric acid, dimethyl formamide, 1,4-dioxane or triethyl phosphate. The most preferred sulphonating agent is chlorosulphonic acid. It is preferred that the sulphonating agent is used in a molar excess over the polyketone.

The new polymers are chemically reactive and can be used as precursors for further chemical transformations. An example is the preparation of thiol containing polymers by reacting the sulphonated polyketone with $PCl_5$ and subsequent reduction. The product is a thiol polymer of one or more types of unit of the general formula:

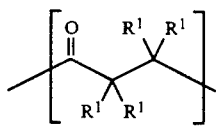

(IV)

where $R^1$ can be independently selected from H or $C_1$ to $C_{10}$ alkyl or SH with the proviso that at least one $R^1$ is SH. Such thiol polymers may of course also contain one ore more types of unit having formulae analogous to the formulae (I)—(III) given above. Such thiol containing polymers can be used inter alia as ion-exchange resins.

By virtue of their strongly acidic properties, the sulphonated polyketones of the present invention are also useful catalysts for processes which require an acid catalyst. An example of such a process is esterification wherein a carboxylic acid, typically a $C_1$ to $C_{10}$ aliphatic carboxylic acid is reacted with an alcohol, typically a $C_1$ to $C_{10}$ aliphatic alcohol to produce the corresponding ester.

According to the present invention there is therefore provided a process for the preparation of an ester whose process comprises reacting a carboxylic acid with an alcohol in the presence of a sulphonated polyketone as described above.

The sulphonated polyketones of the present invention are also effective as agents for removing ammonia or amines from solution. This is particularly advantageous when the medium containing ammonia or amines does not dissolve the sulphonated polyketone. Thus a solution of ammonia or amine in such a medium can be pumped or otherwise drawn through a bed of the sulphonated polyketone at a rate sufficient to effect complete removal form the medium of the ammonia or amines.

The following examples illustrate the invention.

EXAMPLE 1

A slurry of an ethene/CO copolymer (4 g) (prepared according to EP121965) in 70 ml of dichlorethane was prepared and cooled to 0° C. A solution of $ClSO_3H$ (5.3 ml) in 30 ml of dichloroethane was then added to the slurry, with stirring, over a period of fifteen minutes. The resulting mixture was stirred for a further thirty minutes while the temperature was maintained at 0° C. and then poured into 200 ml of methanol. The resulting product was then filtered, the residue washed twice with water and dried under vacuum. A yield of 5.08 g of a brown granular solid was obtained containing 7.7% by weight of sulphur and 2.95 mmoles $g^{-1}$ of acid sites. Results from $^{13}C$ solid state NMR analysis were consistent with known $SO_3H$ compounds.

EXAMPLE 2

The procedure of Example 1 was repeated using 20% oleum (15.1 ml) as the sulphonating agent. A yield of 6.4 g of a black solid was obtained containing 4.06 mmoles $g^{31\ 1}$ of acid sites and 10.8% by weight of sulphur.

EXAMPLE 3

The procedure of Example 1 was repeated using concentrated sulphuric acid (10 ml) as the sulphonating agent. A yield of 9.82 g of a black solid was obtained which contained 7.54 mmoles $g^{31\ 1}$ of acid sites and 14.2% by weight of sulphur.

EXAMPLE 4

The procedure of Example 1 was repeated using glacial aceticacid as the solvent and concentrated sulphuric acid (5 mL) as the sulphonating agent. The experiment was carried out at 16° C. for one hour. The product was filtered and washed twice with dichloroethane. A pale brown solid (4.20 g) was obtained which contained 1.29 mmoles $g^{-1}$ acid sites and 3.4% by weight of sulphur.

EXAMPLE 5

The procedure of Example 1 was repeated using a mixture of $ClSO_3H$ (5.3 ml) and DMF (12.2 ml) as the sulphonating agent. After addition, the resulting mixture was warmed to 16° C. and stirred for two hours. A pale brown solid (4.20 g) was obtained which contained 1.29 mmoles $g^{-1}$ acid sites and 3.4% by weight of sulphur.

EXAMPLE 6

The procedure of Example 1 was repeated using a mixture of $ClSO_3H$ (5.3 ml) and 1,4-dioxane (13.4 ml) as the sulphonting agent. A dark solid (6.28 g) was obtained containing 2.02 mmoles $g^{-1}$ of acid sites and 3.5% by weight of sulphur.

EXAMPLE 7

The procedure of Example 1 was repeated using a mixture of $ClSO_3H$ (5.3 ml) and triethyl phosphate (36.7 ml) as the sulphonating agent. A yield of 4.31 g of polymer was obtained which contained 0.77 mmoles $g^{-1}$ acid sites and 1.7% by weight of sulphur.

EXAMPLE 8

The procedure of Example 1 was repeated using pyridine-sulphur trioxide (12.5 g) as the sulphonating agent. The temperature was increased to 16° C. and the reaction carried out over twenty four hours. A yield of 4.16 g of polymer was obtained which contained 0.82 mmoles $g^{-1}$ of acid sites and 0.3% by weight of sulphur.

EXAMPLE 9

The procedure of Example 8 was repeated using 2,6-lutidine-sulphur trioxide (27 g) as the sulphonating agent. A grey solid was obtained (3.68 g) containing 0.23 mmoles $g^{-1}$ of acid sites and 0.1% by weight of sulphur.

EXAMPLE 10

A sample of an ethene/propene/CO terpolymer (5 g), containing 7 mole % propene in form of beads of 250-600 um diameter, was suspended in 50 ml of dichloroethane. The resulting mixture was cooled to 0° C. A solution of $ClSO_3H$ (6 ml) in dichloroethane (50 ml) was added, with stirring, over a period of 45 minutes. The beads were then separated by filtration, washed twice with dichloroethane, twice with water and then dried under vacuum. The beads were found to contain 6.9% by weight of sulphur and 3.2 mmoles $g^{-1}$ of acid sites.

EXAMPLE 11

A sample of the sulphonated polyketone (5 g) prepared as described in Example 1 was suspended in $CH_3CCl_3$ (50 ml) containing 4 g of $PCl_5$. The resulting mixture was stirred at room temperature for three hours. The solution was then filtered and the solid product washed twice with $CH_3CCl_3$. The washed product was then suspended in 50 ml of acetic acid and 5 g of zinc powder added to the mixture, with stirring. The reaction was then left for sixteen hours. The resulting mixture was poured int 500 ml water prior to filtration. The product was further treated with 500 ml of 1M HCl and the resulting solution filtered again. A yield of 4.75 g of a thiol-containing product was obtained.

EXAMPLE 12

Esterification of Acetic Acid

A sample of the sulphonated polyketone (100 mg) prepared as described in Example 1 was suspended in a mixture of acetic acid (110 mmole), methanol (110 mmole) and cyclohexane (0.60 g, used as internal standard in gas chromatography). The reaction mixture was stirred at 55° C. for three hours. Samples were extracted at 30 minute intervals and analysed for ester content using gas chromatography.

The reaction was repeated except the sulphonated polyketone was replaced by a commercial sulphonic acid polymer, Amberlyst 15.

The reaction was further repeated in the absence of a catalyst.

The results are shown in FIG. 1.

EXAMPLE 13

A sample of the sulphonated polyketone (2 g) prepared as described in Example 1 was added to a burette as a slurry in 30 ml of methanol. Diethylamine (60 mmole) was added to the burette and allowed to diffuse through the polymer at a rate of 10 bed volumes per hour. The polymer effluent was collected in 5 ml aliquots. Alternate aliquots were titrated with 14 mM HCl to determine amine content, using bromothymol blue as indicator. The results are shown in FIG. 2.

I claim:

1. A polymer comprising one or more units of the general formula:

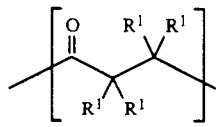

where the $R^1$ groups are independently selected form H or $C_1$ to $C_{10}$ alkyl or $SO_3H$ with the proviso that at least one $R^1$ group is $SO_3H$, and said polymer containing from 15 to 100% by weight of the polymer of units of formula (I).

2. A polymer as claimed in claim 1 where the $R^1$ groups are independently selected from H or methyl or $SO_3H$.

3. A polymer as claimed in claim 1 which is a copolymer comprising one or more units having the formula (I) and one or more types of unit having the formula:

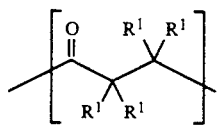

where the $R^1$ groups are selected from H or $C_1$ to $C_{10}$ alkyl only.

* * * * *

UNITED STATES PATENT AND TRADEMARK OFFICE
CERTIFICATE OF CORRECTION

PATENT NO. : 5,153,280
DATED : October 6, 1992
INVENTOR(S) : STEPHEN L. BROWN

It is certified that error appears in the above-identified patent and that said Letters Patent is hereby corrected as shown below:

Column 1, line 8, "EP234671" should read --EP213671--.

Column 2, line 46, change "ore" to --or--.

Column 3, line 2, change "form" to --from--.

Column 3, line 65, "(36.7" should read --(26.7--.

Column 4, line 40, change "int" to --into--.

Column 5, line 16 (claim 1, line 3) change "form" to --from--.

Signed and Sealed this

Twenty-eighth Day of September, 1993

*Attest:*

BRUCE LEHMAN

*Attesting Officer*     Commissioner of Patents and Trademarks